(12) United States Patent
Siegl

(10) Patent No.: US 11,897,641 B2
(45) Date of Patent: Feb. 13, 2024

(54) AEROSOL CONTAINER MADE OF PLASTIC

(71) Applicant: ALPLA Werke Alwin Lehner GmbH & Co. KG, Hard (AT)

(72) Inventor: Robert Siegl, Dornbirn (AT)

(73) Assignee: ALPLA WERKE ALWIN LEHNER GMBH & CO.KG, Hard (AT)

( * ) Notice: Subject to any disclaimer, the term of this patent is extended or adjusted under 35 U.S.C. 154(b) by 276 days.

(21) Appl. No.: 16/299,476

(22) Filed: Mar. 12, 2019

(65) Prior Publication Data
US 2019/0225355 A1    Jul. 25, 2019

Related U.S. Application Data

(63) Continuation of application No. PCT/EP2017/068982, filed on Jul. 27, 2017.

(30) Foreign Application Priority Data

Sep. 12, 2016    (CH) ........................... 1183/16

(51) Int. Cl.
*B65B 3/02*    (2006.01)
*B65D 83/38*    (2006.01)
(Continued)

(52) U.S. Cl.
CPC .............. *B65B 3/022* (2013.01); *B29B 11/14* (2013.01); *B65D 1/0246* (2013.01);
(Continued)

(58) Field of Classification Search
CPC . B65D 3/75; B65D 3/38; B65D 3/207; B65D 3/16; B65D 3/74; B65D 1/0246;
(Continued)

(56) References Cited

U.S. PATENT DOCUMENTS 3,434,626 A  *  3/1969  Kinslow, Jr. ......... B65D 1/0276
                                                220/608
3,843,005 A      10/1974  Uhlig
                         (Continued)

FOREIGN PATENT DOCUMENTS

CN        1036186 A     10/1989
CN      101027229 A      8/2007
                  (Continued)

OTHER PUBLICATIONS

International Search Report and Written Opinion issued in corresponding International Patent Application No. PCT/EP2017/068982, 16 pages (dated Oct. 24, 2017).
(Continued)

*Primary Examiner* — Lien M Ngo
(74) *Attorney, Agent, or Firm* — BUCHANAN INGERSOLL & ROONEY PC

(57) ABSTRACT

The present disclosure relates to an aerosol container made of plastic, the container having a neck, the opening of which is closeable in a pressure-tight manner by a valve unit that can be actuated by a pushbutton, the container being Tillable with a liquid or gaseous propellant and a liquid to be sprayed. The aerosol container can be an injection cast preform with an elongated tubular preform body. The preform body is closed by a dome-shaped convex preform base, beyond which an integrally formed stand region projects in an axial direction. The preform body adjoins the opening of the neck at the opposite axial longitudinal ends of the preform body.

19 Claims, 2 Drawing Sheets

Figure 1:
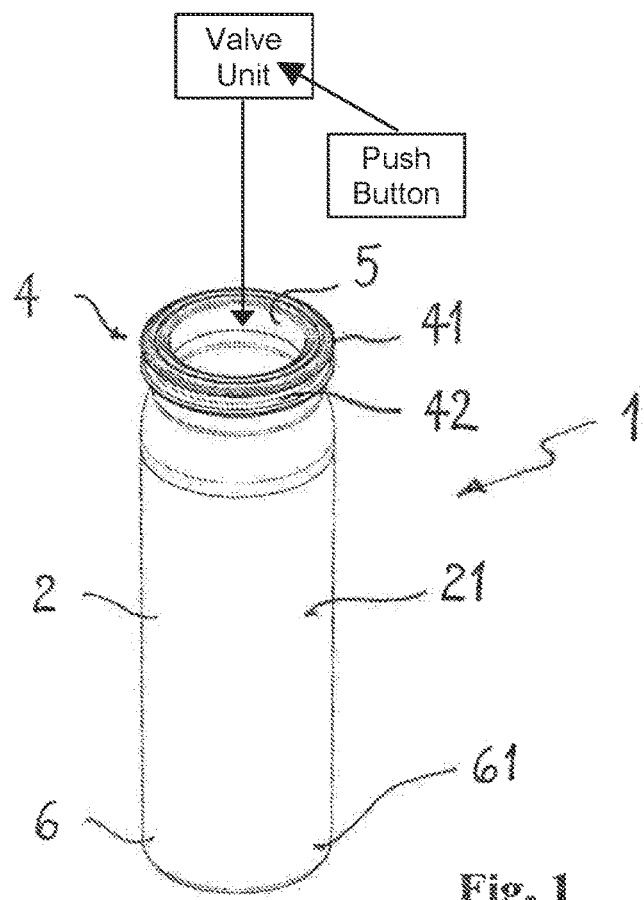

(51) Int. Cl.

| | | |
|---|---|---|
| *B29B 11/14* | (2006.01) | |
| *B65D 1/02* | (2006.01) | |
| *B65D 83/20* | (2006.01) | |
| *B65D 83/14* | (2006.01) | |
| B29L 31/00 | (2006.01) | |
| B29B 11/08 | (2006.01) | |
| B29C 49/06 | (2006.01) | |
| B29C 49/64 | (2006.01) | |
| B29B 11/12 | (2006.01) | |
| B29C 49/08 | (2006.01) | |
| B29K 105/26 | (2006.01) | |
| B29K 105/16 | (2006.01) | |
| B29C 49/00 | (2006.01) | |

(52) U.S. Cl.
CPC ........... *B65D 83/207* (2013.01); *B65D 83/38* (2013.01); *B65D 83/75* (2013.01); *B29B 11/08* (2013.01); *B29B 11/12* (2013.01); *B29C 49/0005* (2013.01); *B29C 49/06* (2013.01); *B29C 49/071* (2022.05); *B29C 49/08* (2013.01); *B29C 49/6427* (2013.01); *B29C 2791/006* (2013.01); *B29C 2791/007* (2013.01); *B29C 2949/078* (2022.05); *B29C 2949/0781* (2022.05); *B29C 2949/0817* (2022.05); *B29C 2949/0818* (2022.05); *B29C 2949/0826* (2022.05); *B29C 2949/0827* (2022.05); *B29C 2949/0829* (2022.05); *B29C 2949/0836* (2022.05); *B29C 2949/22* (2022.05); *B29C 2949/24* (2022.05); *B29C 2949/26* (2022.05); *B29C 2949/28* (2022.05); *B29C 2949/302* (2022.05); *B29C 2949/3016* (2022.05); *B29C 2949/3056* (2022.05); *B29K 2105/16* (2013.01); *B29K 2105/26* (2013.01); *B29L 2031/7142* (2013.01)

(58) Field of Classification Search
CPC ............. B29L 2031/7142; B28B 11/08; B29B 2911/1404; B29B 2911/14993; B29B 2911/14486; B29B 11/14; B29B 11/12; B65B 3/022; B29C 49/0005; B29C 49/06; B29C 49/071; B29C 49/624; B29C 49/08; B29C 2791/006; B29C 2791/007; B29C 2949/078
USPC .......... 264/524, 531; 222/401, 402, 222/402.1–402.25; 215/374–377
See application file for complete search history.

(56) References Cited

U.S. PATENT DOCUMENTS

| | | | | |
|---|---|---|---|---|
| 3,926,324 | A * | 12/1975 | Zavasnik | B65D 1/0276 215/373 |
| 4,127,207 | A | 11/1978 | Hubert et al. | |
| 4,422,559 | A | 12/1983 | Landis | |
| 4,861,260 | A | 8/1989 | Bartley et al. | |
| 4,952,134 | A | 8/1990 | Bartley et al. | |
| 5,066,081 | A * | 11/1991 | Bartley | B29C 49/0073 215/373 |
| 5,083,685 | A | 1/1992 | Amemiya et al. | |
| 5,122,325 | A | 6/1992 | Bartley et al. | |
| 5,160,059 | A * | 11/1992 | Collette | B29C 49/0078 215/375 |
| 5,206,062 | A * | 4/1993 | Amemiya | B65D 83/38 428/35.7 |
| 5,522,548 | A * | 6/1996 | Gallien | B65D 83/32 222/402.1 |
| 5,573,043 | A | 11/1996 | Fuehrer | |
| 5,709,324 | A | 1/1998 | Peronnet et al. | |
| 6,296,471 | B1 * | 10/2001 | Cheng | B29C 33/42 249/117 |
| 6,390,326 | B1 * | 5/2002 | Hung | B65D 83/38 220/616 |
| 7,226,579 | B1 * | 6/2007 | Mekata | A01N 25/06 424/405 |
| 8,281,960 | B1 * | 10/2012 | Gers | B05B 11/3011 222/377 |
| 8,827,122 | B2 * | 9/2014 | Dennis | B65D 83/38 222/402.1 |
| 8,960,503 | B2 * | 2/2015 | Soliman | B65D 81/2053 222/402.1 |
| 2003/0129142 | A1 * | 7/2003 | Schroeder | B65D 83/205 424/47 |
| 2006/0060554 | A1 | 3/2006 | Garman | |
| 2008/0093393 | A1 * | 4/2008 | Kim | B65D 83/205 222/402.1 |
| 2011/0174827 | A1 * | 7/2011 | Patel | B65D 83/38 220/636 |
| 2013/0082074 | A1 * | 4/2013 | Armstrong | B29C 49/06 222/402.1 |
| 2015/0034584 | A1 | 2/2015 | Renner et al. | |
| 2015/0329273 | A1 * | 11/2015 | Salameh | B65D 83/40 222/402.1 |

FOREIGN PATENT DOCUMENTS

| | | |
|---|---|---|
| EP | 0465741 A1 | 1/1992 |
| EP | 0734955 A2 | 10/1996 |
| EP | 0873946 A1 | 10/1998 |
| EP | 1791769 B1 | 3/2011 |
| EP | 2962832 A1 | 1/2016 |
| FR | 2902083 A1 | 12/2007 |
| WO | 2006032113 A1 | 3/2006 |
| WO | 2013112913 A1 | 8/2013 |

OTHER PUBLICATIONS

German Translation of the Chinese Office Action dated Jan. 20, 2021, by the Chinese Patent Office in corresponding Chinese Patent Application No. 201780055384.9. (2 pages).

Office Action dated Nov. 20, 2020, by the European Patent Office in corresponding European Patent Application No. 17746066.4. (10 pages).

International Search Report (Form PCT/ISA/201) dated Dec. 9, 2016, by the European Patent Office in corresponding International Application No. PCT/CH11832016. (8 pages).

* cited by examiner

AEROSOL CONTAINER MADE OF PLASTIC

RELATED APPLICATION

This application claims priority as a continuation application under 35 U.S.C. § 120 to PCT/EP2017/068982, which was filed as an International Application on Jul. 27, 2017 designating the U.S., and which claims priority to Swiss Application 01183/16 filed in Switzerland on Sep. 12, 2006. The entire contents of these applications are hereby incorporated by reference in their entireties.

FIELD

The present disclosure relates to an aerosol container of plastic.

BACKGROUND INFORMATION

Aerosol containers have been manufactured of metal, such as tin sheet or of aluminium. Aerosol containers of glass are also found on the market. Herewith, one should particularly take into account the directive EC 75/324 of the European Community which is effective for such containers with a packaging size above 50 ml. Aerosol containers of metal can start to rust after a while. Coatings, with which the metal containers are protected from rust, particularly on their inner side, can emit undesirable substances such as bisphenol A. Concerning metal containers, there also exists a certain danger of surfaces with which they come into contact being able to become scratched. On the other hand, aerosol containers of glass can break given incorrect handling, for example if dropped onto the ground.

For this reason, for some time now there has been an interest in designing aerosol containers as plastic containers. Several reasons favour the replacement of known metallic pressurised aerosol containers by aerosol containers of plastic. The plastic containers can be manufacturable in a more energy-efficient and inexpensive manner than aerosol containers of metal or aluminium. However, the replacement of known aerosol containers of tin sheet or aluminium by those of plastic is not trivial, since pressurised aerosol containers as a rule need to withstand significantly higher inner pressures than is the case for example with plastic bottles for carbonated soft drinks. Whereas with soft drinks bottles inner pressures of, for example, 2 bar to 4 bar are used, aerosol containers of plastic should withstand inner pressures of, for example, 5 bar to 15 bar at room temperature or, given heating, even inner temperatures of up to 40 bar.

Aerosol containers of plastic are to be chemically stable with regard to the applied propellant gas and the filling medium. It is also known that different plastics can change their mechanical characteristics for the worse given a contact for example with soap solutions or the like. Hence for example a contact of the container base with a soap solution as can often occur in bathrooms can initiate stress tears in the container base, the stress tears leading to possible failure of the base.

One should also take into account the fact that some plastics can be easily flammable. For this reason, given small wall thicknesses and for example combustible propellants, a cigarette which briefly comes into contact with the surface of the plastic container can lead to problematic situations.

SUMMARY

An aerosol container of plastic is disclosed, the aerosol container comprising: a neck with an opening that is closable in a pressure-tight manner by way of a valve unit which can be actuated by a push button, the aerosol container being fillable with a liquid or gaseous propellant and a liquid which is to be sprayed; an injection-moldable preform with an elongate, tube-like preform body, said preform body including a convex, dome-shaped preform base; a standing region which is integrally formed as one piece which extends beyond the preform base and projects in an axial direction; and at an opposite axial longitudinal end of the preform body, the neck with an opening, connects onto the preform body.

BRIEF DESCRIPTION

Figure 2:
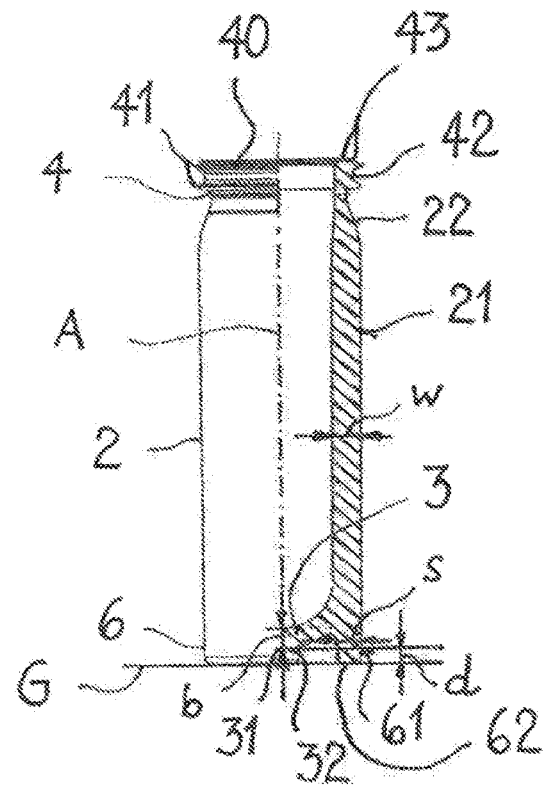
Figure 3:
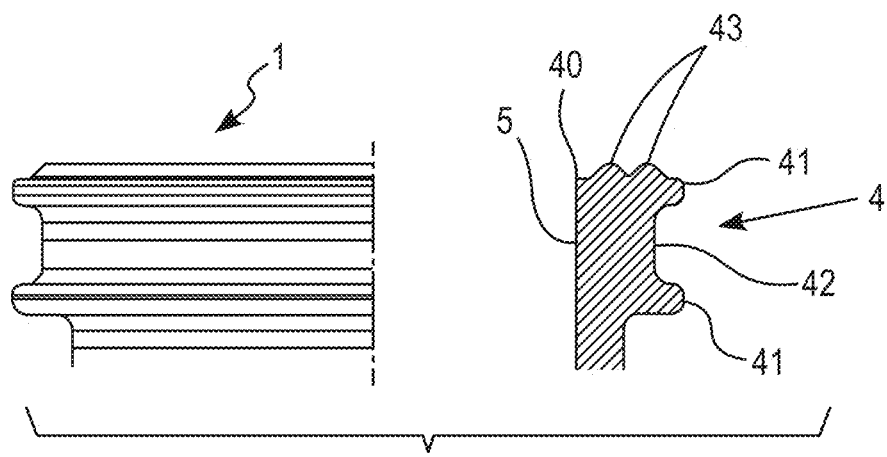
Figure 4:
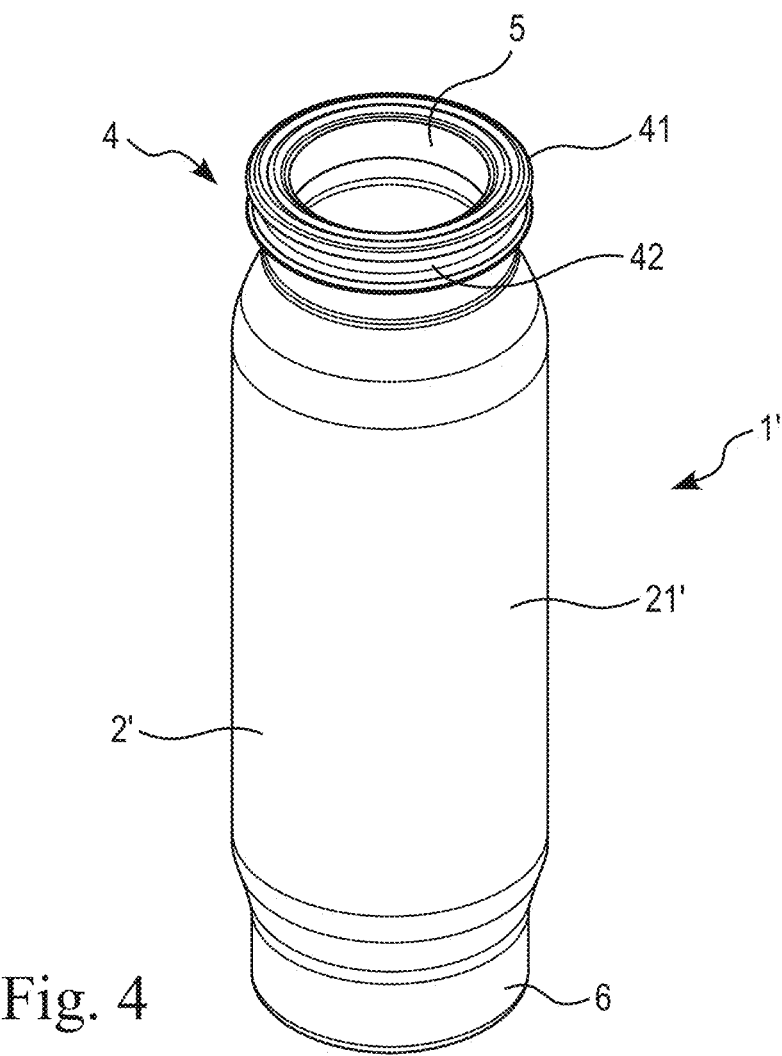

Further advantages and features of the invention which can result from the subsequent description of exemplary embodiments are described with reference to the schematic drawings which are not true to scale. There are shown in:

FIG. 1 a perspective view of an aerosol container according to a first exemplary embodiment;

FIG. 2 a representation of the exemplary aerosol container which is axially sectioned at one half;

FIG. 3 a detail enlargement of an exemplary neck of the aerosol container of plastic which is represented in FIG. 2; and FIG. 4 a perspective view of an exemplary aerosol container according to a second embodiment.

DETAILED DESCRIPTION

The present disclosure provides an aerosol container of plastic which can address issues regarding known aerosol containers. Herein, stress cracks in the plastic material, for example of the container base or the container shoulder as a result of internal stresses of the applied plastic material and due to the occurring inner pressure can be avoided. Such cracks could enlarge over the course of the storage duration and lead to leakages or even to a complete failure of the regions of the plastic container which are affected by this, for example of the container base or the container shoulder. Impairments to the mechanical strength, such as of the container base, for example due to contact with soap solution or the like, should be preventable.

An exemplary aerosol container of plastic as disclosed includes a neck whose opening is closable or closed in a pressure-tight manner by way of a valve unit which can be actuated by push button, and which is fillable or filled with a liquid or gaseous propellant and a liquid which is to be sprayed. The aerosol container is designed and configured as an injection-moulded preform with an elongate, tube-like preform body. The preform body is closed with a convex, dome-shaped preform base, beyond which a standing region which is integrally formed as one piece projects in the axial direction. At its opposite axial longitudinal end, the preform body connects to the neck with the opening. The neck is designed and configured for receiving the valve unit.

It is to be understood that the preform can be designed and configured in a single-piece manner and thereby the standing region is also encompassed by the single-piece nature. Surprisingly, it has been found that an aerosol container of plastic which is designed and configured as a preform in an injection moulding method is adequately resistant to inner pressure without a proneness to the phenomenon of stress cracking being increased compared for example to containers of a greater wall thickness of the preform which are biaxially stretch-blow moulded for example in a blow moulding method. A standing region which is integrally formed as one piece projects axially beyond the base of the preform. By way of this, one can prevent the preform base of the preform which is placed on a standing surface of the standing region from coming into contact with soap solution or the like and stress cracks from being able to be produced in the preform base on account of this. The injection point of the preform is also protected by the standing region which projects axially beyond the container base. As a rule, this can not be injected in a completely homogeneous and stress-free manner as the remaining preform body. On account of this, it can be more prone with regard to brief stress peaks as could occur for example given an impact onto a firm underlay. The standing region can prevent the container base from suffering such stress peaks. The aerosol container of plastic which is designed and configured as an injection moulded preform has a high intrinsic stiffness and cannot be compressed by hand. On account of the greater wall thickness of the preform, this is also resistant with regard to local higher temperature loads, as could occur for example due to an inadvertent contact of surface of the plastic container with a cigarette tip.

An increased inner pressure in the context of the present disclosure is to be understood as an inner pressure of, for example, 500 kPa to 1500 kPa at a room temperature of, for example, 22° C., which is increased compared to the atmospheric pressure. The aerosol container of plastic can be hereby designed and configured in a manner such that it withstands the increased inner pressure for at least six months from the production date. The bursting pressure of the aerosol container is equal or larger than, for example, 2200 kPa and is preferably from, for example, 3000 kPa to 4000 kPa.

In an exemplary variant embodiment of the aerosol container, a standing surface of the standing region can project beyond an outer side of the convex preform base at its deepest location by a distance of, for example, 1.5 mm to 3 mm, preferably by, for example, 1.8 mm to 2.6 mm. With the specified distances of an outer side of the container base to the underlay, one can ensure that the container base does not come into contact with a pool of soap solution or the like, which is present for example on the underlay.

In a further exemplary variant embodiment of the aerosol container, the standing region can be designed and configured as a hollow cylinder section which is closed in the peripheral direction. The design of the hollow-cylindrical standing region closed in the peripheral direction gives this region an increased intrinsic stiffness. By way of this, there results the possibility of moulding out the standing region also with a lower wall thickness than the remaining preform on injection moulding. The hollow-cylindrical standing region can also accommodate radial forces and stresses for example due to the increased inner pressure and therefore relieve the region around the injection point, said region often having a tendency to form stress cracks. A wall thickness of the hollow-cylindrical standing region can be larger, equal or smaller than an average wall thickness of the preform body.

In an alternative exemplary variant embodiment of the aerosol container, the standing region can be formed by a predefined number of standing legs which project axially beyond the preform base. Herein, the stand legs are separated from one another by way of longitudinal slots which extend essentially in the axial direction. The provision of a predefined number of standing legs which are separated from one another can increase the steadiness of the plastic container. The longitudinal slots which separate the standing legs from one another permit the outward displacement of fluid enclosed by the standing region. Furthermore, plastic material can be saved due to the provision of individual standing legs instead of a closed cylindrical section.

In an exemplary embodiment of the aerosol container with standing legs, their predefined number can be at least three. Herein, the standing legs can taper to their free axial longitudinal ends, thus to the respective standing surfaces, so that a quasi-pointwise contact results on placing the aerosol container onto an underlay. Since a plane is defined by three points, a very stable position can result due to this and irregularities of the underlay can be compensated for.

A radially measured exemplary wall thickness of the standing region of the aerosol container can be, for example, 1 mm to 6 mm. In a further exemplary variant embodiment of the aerosol container which a designed and configured as an injection moulded preform, a jacket of the standing region can connect transitionlessly onto an outer wall of the preform body. Hereby, the jacket and the outer wall of the preform body can be flush. The jacket and the outer wall of the preform can therefore be designed as a straight circular cylinder, neglecting draft angles.

In an exemplary variant embodiment of the aerosol container, the preform body can have an average wall thickness of, for example, 1 mm to 6 mm. The wall thickness is hereby measured perpendicularly to the wall of the preform body. A preform with the specified wall thicknesses is manufacturable in the injection moulding method without excessive stresses which compromise the mechanical characteristics of the preform occurring. Such stresses can occur on cooling down the injection-moulded preform and are higher, the greater is the difference between the outer diameter of the preform and its inner diameter, or the larger is the wall thickness of the preform. The stresses are a result of the different contraction of the outer wall and the inner wall of the injection moulded preform. The stresses are further dependent on the ratio of the injecting temperature to the cooling temperature. The higher the injecting temperature, the greater are the stresses given the same cooling temperature, the same plastic and the same preform. These thermal stresses could superimpose with the internal pressure stresses which occur as a result of the increased inner pressure of the plastic aerosol container. These thermal stresses can be largely reduced by way of the selected wall thickness range. The base region of the aerosol container can be designed and configured in a convexly dome-shaped manner. Bending stresses in the base region can be largely avoided by way of this approximation to the spherical shape.

Due to the preform base also having a wall thickness of, for example, 1 mm to 6 mm in a further exemplary variant embodiment variant of the aerosol container, thermal stresses can also be largely avoided in this region of the aerosol container. Here too, the wall thickness is measured perpendicularly to the wall of the preform base.

It has been found to be useful for the handing and control of the container contents if, in a further exemplary variant embodiment of the aerosol container, the preform body includes at least one transparent section which extends over its axial length. This transparent section can permit a simple filling level control or in combination with a scale a very simple dosage quantity estimation, which can not only be relevant for medical applications such as for example asthma sprays or the like, but also for numerous other applications.

A further exemplary variant embodiment of the aerosol container can envisage its preform body being designed transparently as a whole. Here too, a scale can be incorporated.

In a further exemplary variant embodiment of the aerosol container, this can include (e.g., consist of) a plastic which on injection moulding the preform has a ratio of its flow length to a wall thickness which is to be produced in injection moulding of, for example, 20 to 70. With these ratios, the injection moulding process of the aerosol container can be carried out with an economically acceptable cycle time and on the other hand thermally related stresses in the preform as a result of the different contraction of the plastic material on the outer wall and on the inner wall of the preform, the contraction occurring on cooling, can be largely avoided.

In an exemplary embodiment, the aerosol container which is designed and configured as an injection moulded preform can include (e.g., consist of) a plastic, such as viscosity, of, for example, 0.7 dl/g to 1.6 dl/g, preferably, for example, 0.78 dl/g to 0.90 dl/g measured according to ASTM D4603. A gentle processing of such highly viscous plastic materials which avoids an excessive degradation indeed demands an increased effort and in particular can increase the sojourn times of the plastic material in the preform manufacturing device. On the other hand, a stress formation on cooling the preform can be combatted by the gentle processing. A gentle processing of the highly viscous plastic material can be assisted for example by way of the plastic material being transported to the preform cavity through a melt channel which at its narrowest location, at the entry into the preform cavity, has a significantly larger diameter than the commonly applied melt channels. Given a preform which is manufactured in an injection moulding process or in a combination of injection moulding and extrusion methods, this can manifest itself in an injection point in the preform base which has a diameter of, for example, 5 mm to 9.5 mm, preferably, for example, 5.4 m to 6.8 mm.

With regard to the mentioned degradation, a splitting and therefore a shortening of the polymer molecule chains occurs. A degradation can be effected by way of a melting and shearing of the plastic material which is to be processed, in the extruder screw, which can lead to a reduction of the viscosity of the plastic material. However, long molecule chains can be desired since preforms with long molecule chains lead to a higher strength of the plastic containers which are manufactured from the preforms and to a higher durability of the container with regard to inner pressure, impacts, creep and bursting. The large injection point of, for example, 5 mm to 9.5 mm can ensure this long chainedness. Herein, the direct opening at the entry into the preform cavity also has this enlarged diameter, in order to reduce the back-pressure at the extruder. As a result of the back-pressure which is significantly reduced compared for example to a diameter of the injection point of, for example, 3 mm, the molten plastic material, in particular the molten polyester material can have a viscosity of, for example, larger than 0.7 dl/g, preferably, for example, 0.78 dl/g to 0.90 dl/g at the entry into the preform cavity. A parallel alignment of the polymer molecule chains can be largely avoided by way of the large diameter of the injection point or of the entry into the preform cavity and the desired viscosity can be retained. By way of this, too great an alignment of the molecules and a crystallisation which is subsequent to this and which would be able to be determined on the preform as an opaqueing which could be detected with the naked eye can be avoided.

Plastic materials with the mentioned high viscosities are known for example from extrusion blow moulding methods, with regard to which the viscosity of the plastic material must be high enough so that a continuous plastic tube is extrudable without the plastic material herein dripping off. The viscosity of these plastic materials is so high that they can only be processed at great pressures and/or high temperatures with the common manufacturing methods for preforms in an injection moulding process or in a combination of injection moulding and extrusion methods. The injection moulding can be effected with a needle shutoff of the melt channel. A hot runner or a cold runner method with a short or with a long injection point can be used. The desired higher viscosities can also be achieved with low-viscosity plastics by way of these being condensed under a vacuum or nitrogen to a viscosity of, for example, 0.7 dl/g to 1.6 dl/g, preferably, for example, 0.78 dl/g to 0.90 dl/g in a separate drying process before the entry into the extruder.

The aerosol container can be designed and configured in a single-layered or multi-layered manner. In an exemplary variant embodiment, the plastic container can include a plastic main component from the group containing (e.g., consisting of) polyethylene terephthalate, polyethylene naphthalate, polyethylene furanoate, polypropylene furanoate, polybutylene furanoate, polylactide, their copolymers or mixtures of the mentioned plastics. The specified plastics have large similarities with regard to their processing ability. They permit the manufacture of transparent plastic containers in an injection moulding method, which for example, meets the desire for transparent pressurised aerosol containers.

The plastic main component can include (e.g., consist partly or also completely of) recycled material. In the case of PET and PEF, they can also be manufactured at least in part from biologic precursors. The applied plastic materials can include short chain branchings or long chain branchings. For example, the polymer molecule chains can comprise so-called joined branchings or a long chain branching (LCB), in order to achieve the desired high viscosity. The polymer molecule chains can also include so-called functional groups which do not lead to the desired branchings until manufacture of the preform with injection moulding. Alternatively, the plastic material can also contain additives which on injection moulding can lead to any type of branchings of the polymer molecule chains. An example of such additives are so-called chain extenders. Herein however, one is to take care that a cross-linking which opposes a thermoplastic deformation of the plastic material does not occur.

In a further exemplary variant embodiment, the plastic main component of the injection-moulded plastic container can contain up to, for example, 20 percent by weight of foreign substances. For example, copolymers, dyes, UV-blockers, stabilisation additives such as for example, glass fibres or glass balls or mixtures thereof, additives or foreign polymers can be admixed to the plastic main component, in order to set the desired characteristics of the injection-moulded plastic container, such as, for example, the UV resistance and UV absorption, impermeability to vapour and oxygen and the like.

In a further exemplary embodiment, the aerosol container can include (e.g., consist of) a plastic, to whose plastic main component further plastics from the group containing (e.g., consisting of) PEN, PEF, PLA, polyester, polyamide, polybutylene terephthalate, polycarbonate, polyolefins, silicones, their copolymers and mixtures of the mentioned plastics are admixed. By way of this, the processing characteristics and also the strength and the barrier characteristics of the plastic material can be matched to the envisaged application in a targeted manner.

The aerosol container of plastic which according to the present disclosure is, for example, manufactured as an injection moulded preform, in principle can have different packaging sizes. However, it has been found to be particularly useful for packaging sizes of, for example, smaller than 50 ml. Hereby, a volume which is delimited by an inner wall of the preform is to be seen as the packaging size. Such small packaging sizes can be applied for example for nose sprays, for insecticides, for nicotine-containing liquids and the like.

According to a further exemplary embodiment, an aerosol container whose periphery of the standing region is essentially equal to a periphery of the preform body is disclosed. The term "essentially equal" is to express the fact that slight differences in the periphery of the preform body to the periphery of the standing region can occur due to the different shrinkage between the preform body and the standing region on cooling to room temperature. Both peripheries are equal in the ideal case. The cross section of the preform body is also not necessarily circular, but can have an arbitrary geometric shape, as long as this includes no undercuts. For example, the inner contour can be designed and configured circularly in cross section and the outer contour can form a polygon, for example a regular hexagon.

According to a further exemplary embodiment, an aerosol container whose periphery of the standing region is smaller than a periphery of the preform body is disclosed. In many injection moulding machines, the preforms are cooled in so-called cooling tubes outside the injection moulding machines, for decoupling the injecting cycle from the cooling cycle. Herein, it is known to apply vacuums of between, for example, 0.05 to 0.95 bar to the outer side of the preform. The preforms are flushed with cold air at the inner side, wherein inner pressures of up to roughly 10 bar are produced. Since the material of the preform is still deformable on introduction into the cooling tubes, the preform body can be enlarged by way of vacuum or overpressure, without hereby changing its material characteristics in the cooled state. It has been found that an axial enlargement and/or a radial enlargement of the preform body by up to, for example, 3 mm is possible, thus an enlargement by, for example, 6 mm in diameter is possible. As a rule, the standing region of the plastic container is not affected by this. The preform body can also be changed in its peripheral shape, thus for example a hexagon or an oval can be produced, by way of applying a vacuum and/or an overpressure.

The aerosol closures which are currently assembled on aerosol containers follow a FEA standard 215 which specifies the neck height at 4 mm+/−0.3 mm. A metal skirt of the valve unit is bent around this 4 mm neck, also called crimping. Two pointed, annularly peripheral prominences which extend parallel to one another are formed on the upper side of the neck. These prominences are covered by a sealing rubber. With the crimping process, the prominences are pressed into the sealing rubber, so that a connection between the valve unit and the plastic container results, the connection being durable with regard to the inner pressure. As a rule, the sealing rubber is designed and configured as a flat seal but can also be designed and configured as an O-ring.

According to a further exemplary embodiment, an immersion tube or an immersion tube for removal of the liquid and whose free end ends at the deepest point of the convex, dome-shaped preform base is unreleasably connected to the valve unit. Due to the convex, thus outwardly arched, dome-like design of base of the plastic container of the aerosol container, the liquid collects at the deepest point of this base. A complete emptying is possible without any problems due to the free end of the tube ending at the deepest point of this base. Hereby, the complete emptying is possible independently of the position of the push button, the push button being at least rotatably arranged on the valve unit.

An aerosol container of plastic which is represented in FIG. 1 is provided in its entirety with the reference numeral 1. The aerosol container 1 is designed and configured as an injection moulded preform and has an elongate, tube-like preform body 2, to which a neck 4 with an opening 5 connects. The neck 4 can include for example a collar 41 with an annularly peripheral groove 42, said collar edging the opening 5. The collar 41 with the annularly peripheral groove 42 simplifies the assembly of a non-represented dispensing device, for example of a valve unit, for a liquid which is stored in the aerosol container under the pressure of a liquid or gaseous propellant. A specific representation of the valve unit for dispensing an aerosol, the valve unit being assembled on the neck of the aerosol container in a pressure-tight manner and being actuatable by way of a push button, has been omitted in the figures for reason of a better overview and would be placed over opening 5.

Two pointed, annularly peripheral prominences 43 which extend parallel to one another are formed on an upper side 40 of the neck 4 of the preform. These prominences 43 are coverable by a sealing rubber. With the crimping process, the prominences can be pressed into the sealing rubber, so that a connection between the valve unit and the aerosol container results, said connection being durable with regard to the inner pressure. The preform body 2 has an outer wall 21 which merges for example in a direct manner into a jacket 61 of a standing region 6 of the plastic container 1. The jacket 61 and the outer wall 21 therefore form a circular cylinder in the exemplary embodiment which is present here. Herein, the standing region 6 projects beyond a preform base which terminates the preform body 2 at its longitudinal end which is opposite to the neck 4. In FIG. 1, the preform base is covered by the standing region 6 which is designed as a cylinder section which is closed in the peripheral direction.

FIG. 2 shows the aerosol container 1 in a representation which is sectioned on half the side along a longitudinal axis A. The preform body 2 has a wall thickness which is 1 mm to 6 mm. The preform body 2 can be designed and configured as tapering towards the neck 4 whilst forming a shoulder 22. As is better evident in FIG. 3, which represents a detail enlargement of the neck of FIG. 2, the neck 4 has two radially outwardly extending collars 41 which are distanced to one another by an annularly peripheral groove 42. The upper of the two collars 41 connects essentially to the upper side 40 of the preform neck 4. The preform base 3 which is arranged at the axial longitudinal end of the preform body 2 which is opposite to the neck 4 includes a convex, thus outwardly extending, dome-shaped design and has a wall thickness b of, for example, 1 mm to 6 mm. The wall thickness of the preform base 3 and the wall thickness w of the preform body 2 can be designed and configured differently from one another. The dome-shaped design of the preform base 3 approximates the shape of a ball section. Bending stresses in the container base 3 which are caused by inner pressure can be avoided by way of this.

The standing section which is again provided with the reference numeral 6 in FIG. 2 is designed and configured as a hollow-cylindrical continuation of the wall of the preform body 2. The standing section has a wall thickness s of, for example, 1 mm to 6 mm. The wall thickness s of the standing section 6 can be designed and configured differently from the wall thickness w of the preform body 2. For example, the wall thickness of the standing section 6 can reduce towards its free end.

A standing surface 62 of the standing region 6 of the aerosol container 1 of plastic projects beyond an outer side 32 of the convex preform base 3 at its location 31 which is deepest in the position of use and which for example can be the injection point of the aerosol container 1, by a distance d of, for example, 1.5 mm to 3 mm, preferably by, for example, 1.8 mm to 2.6 mm. Herein, the upright position of the aerosol container 1 which is placed with its standing region 6 onto a level underlay G is seen as the position of use. With the specified distances of the container base 3 from the underlay G, one can ensure that the container base 3, in particular the injection point 32 cannot come into contact with a pool of soap solution or the like, which is present for example on the underlay. It is to be noted that the injecting-in of the plastic for producing the aerosol container 1 does not need to be effected at the injection point 31 which is essentially centrally on the base, but can also be at any other location of the aerosol container 1. The plastic can also be injected in at several locations. Furthermore, the aerosol container can be overmoulded with a plastic for example in another colour (2-layered) or contain a coloured layer (3-layered). The aerosol container can also comprise a barrier layer.

FIG. 4 shows an aerosol container 1' similar to the aerosol container 1 of FIG. 1. This aerosol container 1' was cooled down outside the injection moulding machine in a so-called cooling tube which has a larger inner diameter than the outer diameter of the injected aerosol container which is prepared for cooling. After inserting the injected aerosol container into the cooling tube, this has been cooled to room temperature by way of applying a vacuum and flushing the interior of the aerosol container with cold air under a vacuum. Hereby, material of the preform body is pressed onto the inner wall of the cooling tube and the preform body 2' is enlarged in its periphery. Accordingly, the outer wall 21' of the aerosol container 1' which is removed from the cooling tube projects beyond the standing region 6.

The aerosol container which is resistant to inner pressure and is designed and configured as an injection-moulded preform has an axial total length for example of 70.5 mm±1.5 mm. The length of the neck 4 is for example 5.1 mm. An outer diameter of the preform body 2 is for example 19.3 mm. An outer diameter of both collars 41 which are arranged on the neck 4 is for example 19.9 mm±0.1 mm. Herein, the wall thickness w of the preform body is for example 3.4 mm. The wall thickness w of the preform body 2 tapers towards the neck 4 whilst forming the shoulder 22. At its narrowest location at the transition of the shoulder 22 to the neck 4, the preform body 2 for example has an outer diameter of, for example, 16.6 mm. The wall thickness b of the container base 3 is for example 2.8 mm. The distance d, by which the standing region 6 projects beyond the deepest point 31, for example the injection point of the aerosol container 1, can be for example, 2 mm. The wall thickness s of the standing region 6 can correspond to, for example, 50 to 100% of the wall thickness of the preform body 2. The tolerance of the dimension is about ±0.3 mm unless specified otherwise.

The aerosol container 1, 1' of plastic is designed and configured as an injection moulded preform. Herein, the term injection moulded is to be understood as a combination of injection moulding and extrusion methods. Herein, a plastic main component of the preform is used, said main component making up at least 80% of the total mass of the preform which on entry into a preform cavity has a viscosity, measured according to ASTM D4603, which has broken down by maximally 0.15 dl/g with respect to a starting viscosity of the plastic main component. The viscosity of the plastic main component on entry into the extruder is herein set to, for example, 0.7 dl/g to 1.6 dl/g, preferably, for example, 0.78 dl/g to 0.90 dl/g. At least the preform body 2 of the preform can be designed and configured in a single-layered or multi-layered manner and includes (e.g., consists of) at least 80% percent by weight (% w/w) of a plastic main component from the group containing (e.g., consisting of) polyethylene terephthalate, polyethylene naphthalate, polyethylene furanoate, polylactide, their copolymers or mixtures of the mentioned plastics. Up to 20% w/w of foreign substances can be admixed to the plastic main component. For example, copolymers, dyes, UV blockers, stabilisation additives such as for example, glass fibres or glass balls or mixtures thereof, additives or foreign polymers can be admixed to the plastic main component. The plastic main component can also yet comprise further plastics from the group consisting of PEN, PEF, PPF, PBF PLA, polyester, polyamide, polybutylene terephthalate, polycarbonate, polyolefins, silicones, their copolymers or mixtures of the mentioned plastics.

The suggested aerosol container which is designed and configured as an injection moulded preform can be resistant to inner pressure, has few to no stresses and is resistant to the phenomenon of stress cracking. The aerosol container can also be designed and configured in an at least regionally transparent manner on account of the applied plastics.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An aerosol container of plastic, the aerosol container comprising:

an injection-molded preform with an elongate, tube-like preform body including a wall, a neck with an opening, an outwardly arched dome-shaped preform base and a standing region, the outwardly arched dome-shaped preform base terminates the preform body at one end and the neck with the opening is connected onto the preform body at an opposite axial longitudinal end of the preform body from the outwardly arched dome-shaped preform base, wherein the standing region extends from the outwardly arched dome-shaped preform base in an axial direction beyond the outwardly arched dome-shaped preform base, and which is integrally formed as one piece with the preform; and a valve unit which can be actuated by a push button, the valve unit arranged in the opening to close the preform in a pressure-tight manner, the aerosol container being fillable with a liquid or gaseous propellant and a liquid which is to be sprayed.

2. An aerosol container according to claim 1, wherein the aerosol container being configured with a bursting pressure resistance specified to be equal to or larger than 2200 kPA, or to be 3000 kPa to 4000 kPa.

3. An aerosol container according to claim 2, comprising:

a standing surface of the standing region which projects beyond an outer side of the preform base at its deepest location by a distance (d) within a specified range of 1.5 mm to 3 mm, or within a specified range of 1.8 mm to 2.6 mm.

4. An aerosol container according to claim 3, wherein the standing region is configured as a hollow cylinder section which is closed in a peripheral direction.

5. An aerosol container according to claim 3, wherein the standing region has a radially measured wall thickness (s) of 1 mm to 6 mm.

6. An aerosol container according to claim 3, wherein the preform body has a wall thickness (w) which is 1 mm to 6 mm.

7. An aerosol container according to claim 3, wherein the preform base has a wall thickness (b) which is 1 mm to 6 mm.

8. An aerosol container according to claim 3, wherein the preform body comprises:
at least one transparent section which extends over its axial length.

9. An aerosol container according to claim 3, wherein at least the preform body is completely transparent.

10. An aerosol container according to claim 2, wherein the aerosol container
consists of a plastic which is selected such that on injection moulding has a ratio of its flow length to the injection moulded wall thickness of the preform body of 20 to 70.

11. An aerosol container according to claim 2, wherein the aerosol container consists of a plastic polyester, which has an intrinsic viscosity selected to be within a range of 0.7 dl/g to 1.6 dl/g, preferably 0.78 dl/g to 0.90 dl/g measured according to ASTM D4603.

12. An aerosol container according to claim 2, wherein the aerosol container comprises:
a plastic main component from the group consisting of polyethylene terephthalate, polyethylene naphthalate, polyethylene furanoate, polylactide, polypropylene furanoate, polybutylene furanoate, their copolymers and mixtures of the mentioned plastics.

13. An aerosol container according to claim 12, wherein up to 20 percent by weight of foreign substances are included in the plastic main component.

14. An aerosol container according to claim 13, wherein the foreign substances are copolymers, dyes, UV blockers, stabilisation additives, glass fibres or glass balls or mixtures thereof, additives or foreign polymers.

15. An aerosol container according to claim 14, wherein the aerosol container consists of:
a plastic, which apart from the plastic main component includes yet further plastics from the group consisting of PEN, PEF, PLA, polyester, polyamide, polybutylene terephthalate, polycarbonate, polyolefins, silicones, their copolymers and mixtures of the mentioned plastics.

16. An aerosol container according to claim 2, wherein the aerosol container has a packaging size of smaller than 50 ml.

17. An aerosol container according to claim 2, wherein a periphery of the standing region is essentially equal to a periphery of the preform body.

18. An aerosol container according to claim 2, wherein a periphery of the standing region is smaller than a periphery of the preform body.

19. An aerosol container according to claim 2, comprising:
an immersion tube for removal of liquid, and whose free end ends at a deepest point of the outwardly arched dome-shaped preform base is unreleasably connected to the valve unit.

\* \* \* \* \*